United States Patent
Lee et al.

(10) Patent No.: US 6,950,112 B2
(45) Date of Patent: Sep. 27, 2005

(54) METHOD AND APPARATUS FOR PRODUCING A THREE-DIMENSIONAL MOVING IMAGE

(75) Inventors: Seung Woo Lee, Seoul (KR); Cheol An Kim, Yongin-si (KR); Jae Sub Hwang, Seoul (KR); Young Seuk Song, Seoul (KR)

(73) Assignee: Medison Co., Ltd., Kangwon-do (KR)

( * ) Notice: Subject to any disclaimer, the term of this patent is extended or adjusted under 35 U.S.C. 154(b) by 0 days.

(21) Appl. No.: 10/459,586

(22) Filed: Jun. 12, 2003

(65) Prior Publication Data

US 2003/0231178 A1 Dec. 18, 2003

(30) Foreign Application Priority Data

Jun. 12, 2002 (KR) ................................. 10-2002-0032756

(51) Int. Cl.[7] .............................. G09G 5/00; A61B 8/14
(52) U.S. Cl. ..................... 345/606; 345/610; 600/443
(58) Field of Search .................................. 345/419, 606, 345/607, 608, 609, 610, 475; 600/443

(56) References Cited

U.S. PATENT DOCUMENTS

| | | | | |
|---|---|---|---|---|
| 5,476,096 A | * | 12/1995 | Olstad et al. | 600/443 |
| 5,966,178 A | | 10/1999 | Tashima et al. | |
| 6,083,168 A | * | 7/2000 | Hossack et al. | 600/443 |
| 6,162,174 A | | 12/2000 | Friemel | |
| 6,494,837 B2 | * | 12/2002 | Kim et al. | 600/443 |
| 2002/0003904 A1 | * | 1/2002 | Shinagawa et al. | |
| 2002/0045822 A1 | | 4/2002 | Powers et al. | |

FOREIGN PATENT DOCUMENTS

| | | |
|---|---|---|
| EP | 0 944 026 A2 | 9/1999 |
| KR | 2001-0061963 | 7/2001 |

OTHER PUBLICATIONS

J. Ribas–Corbera, et al., "Interpolation of Cinematic Sequences", IEEE, Applications of Computer Vision, XP–010029164, Nov. 30, 1992, pp. 36–44.

Chris Basoglu, et al., "Computing requirements of modern medical diagnostic ultrasound machines", Parallel Computing, vol. 24, No. 9–10, XP–004148103, Sep. 1998, pp. 1407–1431.

* cited by examiner

*Primary Examiner*—Matthew Luu
(74) *Attorney, Agent, or Firm*—Oblon, Spivak, McClelland, Maier & Neustadt, P.C.

(57) ABSTRACT

Disclosed is an apparatus and method for producing a three-dimensional (3D) moving image of a moving target object. The method comprises the steps of transmitting and receiving ultrasound signals to/from the moving target object; obtaining raw data; generating image frame data based on the obtained raw data; generating virtual image frame data based on the generated image frame data; and rendering a 3D moving image of the moving target object using the image and virtual image frame data. The apparatus comprises a probe, a raw 3D data obtaining unit, and an enhanced live 3D imaging unit for producing a 3D image of the moving target object.

2 Claims, 6 Drawing Sheets

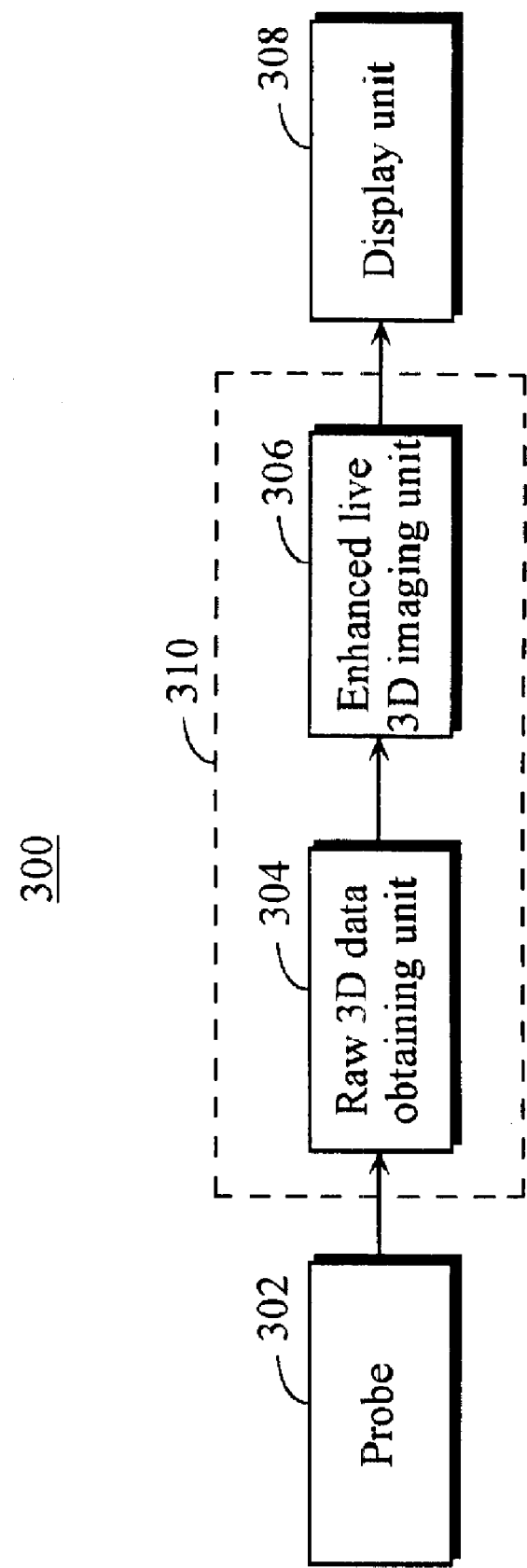

(n-1)$^{th}$ frame (402)    m number of virtual images (404)    n$^{th}$ fame (406)

n$^{th}$ fame (406)    m number of virtual images (408)

Fig. 4C
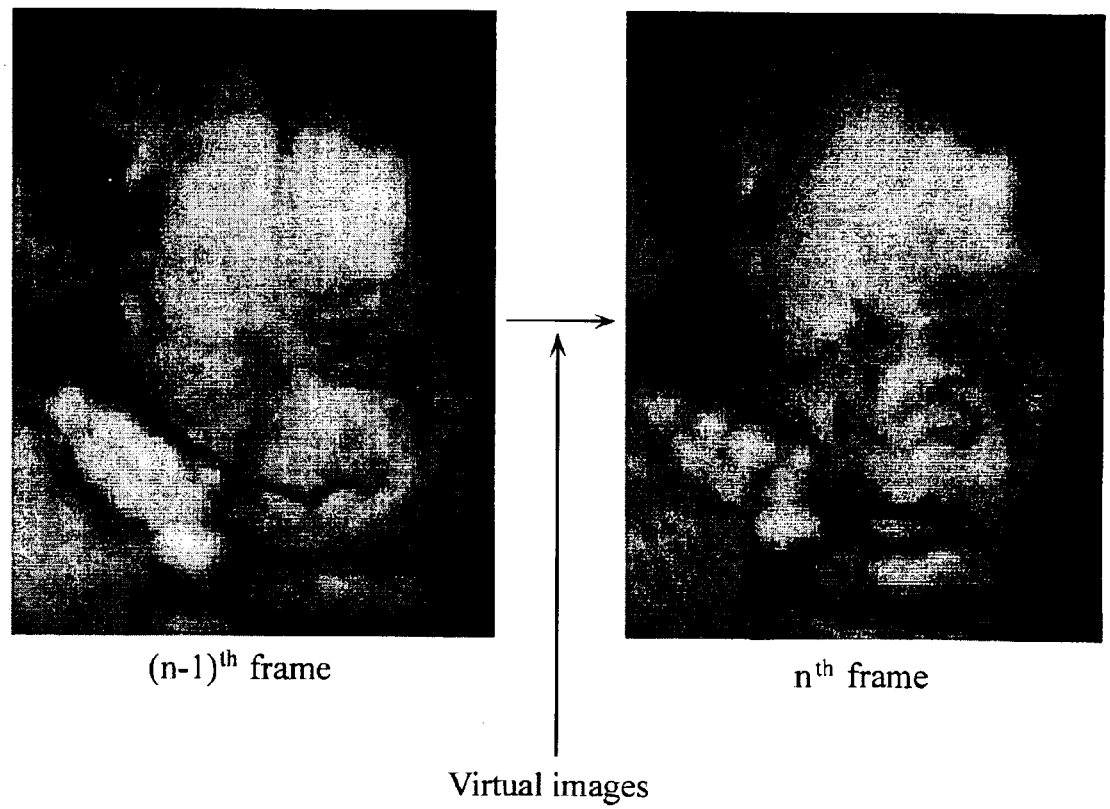
(n-1)ᵗʰ frame      nᵗʰ frame
Virtual images
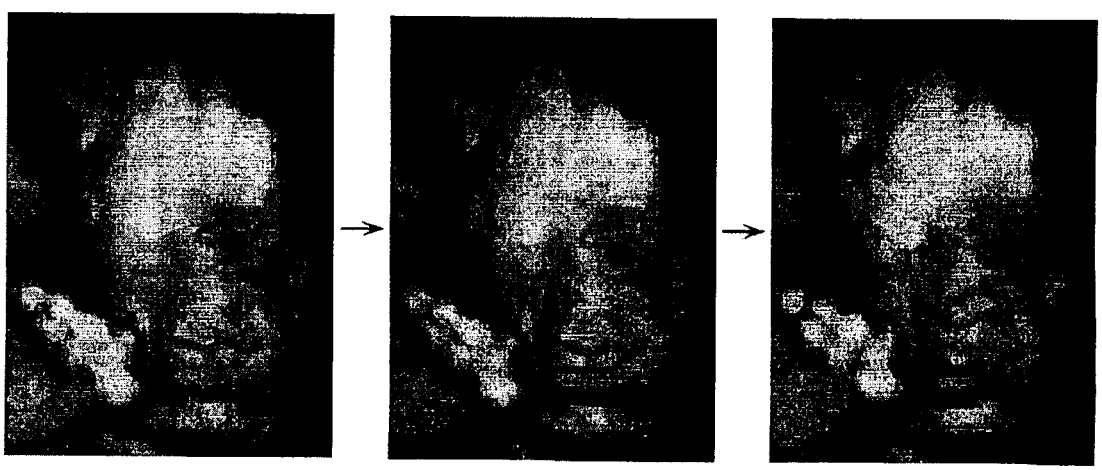

METHOD AND APPARATUS FOR PRODUCING A THREE-DIMENSIONAL MOVING IMAGE

FIELD OF THE INVENTION

The present invention relates generally to ultrasound imaging, and more particularly, to a three-dimensional (3D) ultrasound imaging method and apparatus for producing a 3D moving image of a moving target object.

BACKGROUND OF THE INVENTION

Static 3D images are conventionally produced by obtaining raw 3D data, e.g., data on a coordinate system (x, y, z), through a 3D probe regardless of acquisition time, by stacking frames over one another at a uniform time interval to form consecutive frames, and by processing the consecutive frames using a 3D rendering technique. Where static 3D images are used for ultrasound diagnostic purposes, one may easily make accurate observation, diagnosis, or treatment of the internal state of a human body without performing complicated procedures associated with invasive operations. Thus, static 3D images are widely used. However, static 3D images are not useful in observing a moving target object in real time, such as an embryo in the uterus.

In order to overcome this shortcoming, a live 3D imaging method and apparatus for providing a 3D moving image, rather than static 3D images, has been developed. Herein, a live 3D image should be understood and interpreted as a quasi real-time 3D moving image, representing movement of a moving target object. The live 3D image consists of fewer frames than those of a real-time 3D moving image so that it does not completely represent movement of a moving target object. However, since the live 3D image consists of more frames than static 3D images, e.g., 2 to 4 frames per second, it can represent movement of a moving target object more smoothly than the static 3D images.

Referring to FIG. 1, which illustrates a schematic block diagram of a conventional ultrasound apparatus for producing a live 3D image, live 3D imaging apparatus 100 comprises probe 102 for transmitting and receiving ultrasound signals to/from a moving target object (not shown), i.e., scanning the moving target object; image processing unit 104 for producing a live 3D image by using the reflected ultrasound signals transmitted from probe 102; and display unit 106 for displaying the live 3D image produced by image processor 104.

Image processing unit 104 includes raw 3D data obtaining unit 108 and rendering unit 110. Raw 3D data obtaining unit 108 obtains raw data required for producing the live 3D image based on the reflected ultrasound signals transmitted from probe 102, which are transmitted to rendering unit 110. (Hereinafter, raw data refers to raw 3D data) Raw 3D data obtaining unit 108 may sequentially store raw 3D data corresponding to each frame on a predetermined storage unit (not shown), which are transmitted to rendering unit 110. Rendering unit 110 then performs a conventional rendering process on the raw 3D data transmitted from raw 3D data obtaining unit 108 and produces the live 3D image to be displayed on display unit 106.

Referring to FIG. 2, which shows a flow chart for conventionally producing a live 3D image, probe 102 scans a moving target object by transmitting ultrasound signals to the moving target object and receiving the ultrasound signals reflected therefrom (Step S202). Raw 3D data obtaining unit 108 of image processing unit 104 obtains raw 3D data and stores them on a predetermined storage unit (Step S204). Where the stored raw 3D data correspond to n number of frames, rendering unit 110 reads raw 3D data corresponding to the $(n-1)^{th}$ frame among n number of the frames, which is stored just before the $n^{th}$ frame, and performs a high-speed rendering on the $(n-2)^{th}$ frame, which is stored just before the $(n-1)^{th}$ frame (Step S206). By performing such parallel rendering processes repetitively, rendering unit 110 performs live 3D imaging to produce the live 3D image of the moving target object. Display unit 106 displays the live 3D image thereon (Step S208). The frame rate of the live 3D image displayed on display unit 106 is typically 2 to 4 frames/second.

As described above, with conventional live 3D imaging apparatus 100, displaying images like a cinema is very difficult, since the live 3D image consists of 2 to 4 frames per second while the cinema typically consists of at least 30 frames per second. For example, if a frame rate of the live 3D image is 4 frames per second, the live 3D image may be discontinuously displayed for one second.

Thus, need exists for an apparatus and method for providing a natural looking 3D moving image by raising the conventional frame rate of live 3D image without increasing the calculation load of an live 3D imaging apparatus.

SUMMARY OF THE INVENTION

Therefore, an objective of the present invention is to provide an ultrasound imaging apparatus and method for producing a live 3D image of a moving target object, which looks more natural than a conventional live 3D image, by raising the frame rate of conventional live 3D image by inserting a predetermined number of virtual image frames at a uniform time interval between the live 3D image frames obtained from raw 3D data of the moving target object.

In accordance with one aspect of the present invention, an ultrasound imaging method for producing a 3D moving image of a moving target object, comprises the steps of: a) transmitting ultrasound signals to the moving target object and receiving reflected ultrasound signals; b) obtaining raw data based on the reflected ultrasound signals; c) generating image frame data including a plurality of image frames based on the obtained raw data; d) generating virtual image frame data including a multiplicity of virtual image frames, which are to be inserted between the plurality of image frames, based on the image frame data; and e) rendering a 3D moving image of the moving target object using the image frame and virtual image frame data.

In accordance with another aspect of the present invention, an ultrasound imaging apparatus for producing a 3D moving image of a moving target object, comprises: a probe for transmitting ultrasound signals to the moving target object and receiving reflected ultrasound signals; means for obtaining raw data based on the reflected ultrasound signals; and means for generating image frame data including a plurality of image frames based on the obtained raw data, generating virtual image frame data including a multiplicity of virtual image frames, which are to be inserted between the plurality of image frames, based on the image frame data, and rendering a 3D moving image of the moving target object using the image frame and virtual image frame data.

BRIEF DESCRIPTION OF THE DRAWINGS

The features of the present invention, which are believed to be novel, are set forth with particularity in the appended claims. The present invention, both as to its organization and manner of operation, together with further objects and advantages thereof, may best be understood with reference to the following description, taken in conjunction with the accompanying drawings.

FIG. 3 is a schematic block diagram of an ultrasound imaging apparatus for producing a live 3D image of a moving target object in accordance with the present invention.

FIG. 4C shows an example of the virtual image frames produced by using interpolation in accordance with the present invention.

DETAILED DESCRIPTION OF THE PRESENT INVENTION

Figure 1:
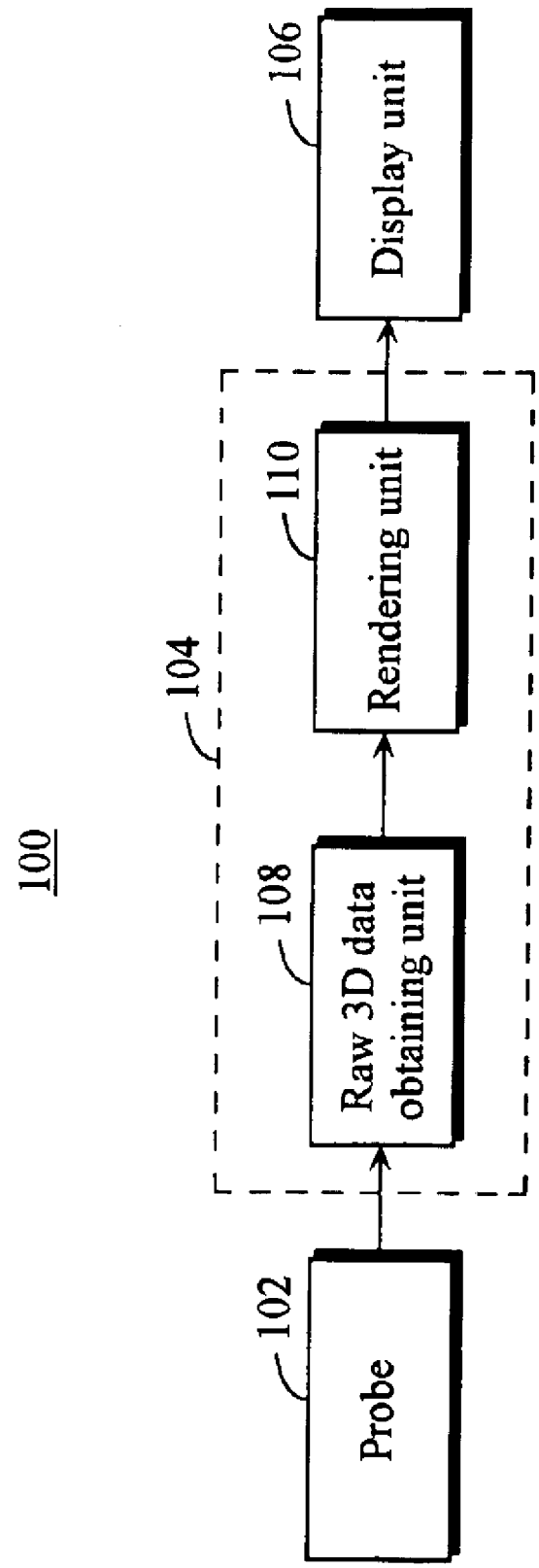
FIG. 1 is a schematic block diagram of a conventional ultrasound imaging apparatus for producing a live three-dimensional (3D) image of a moving target object.
Figure 2:
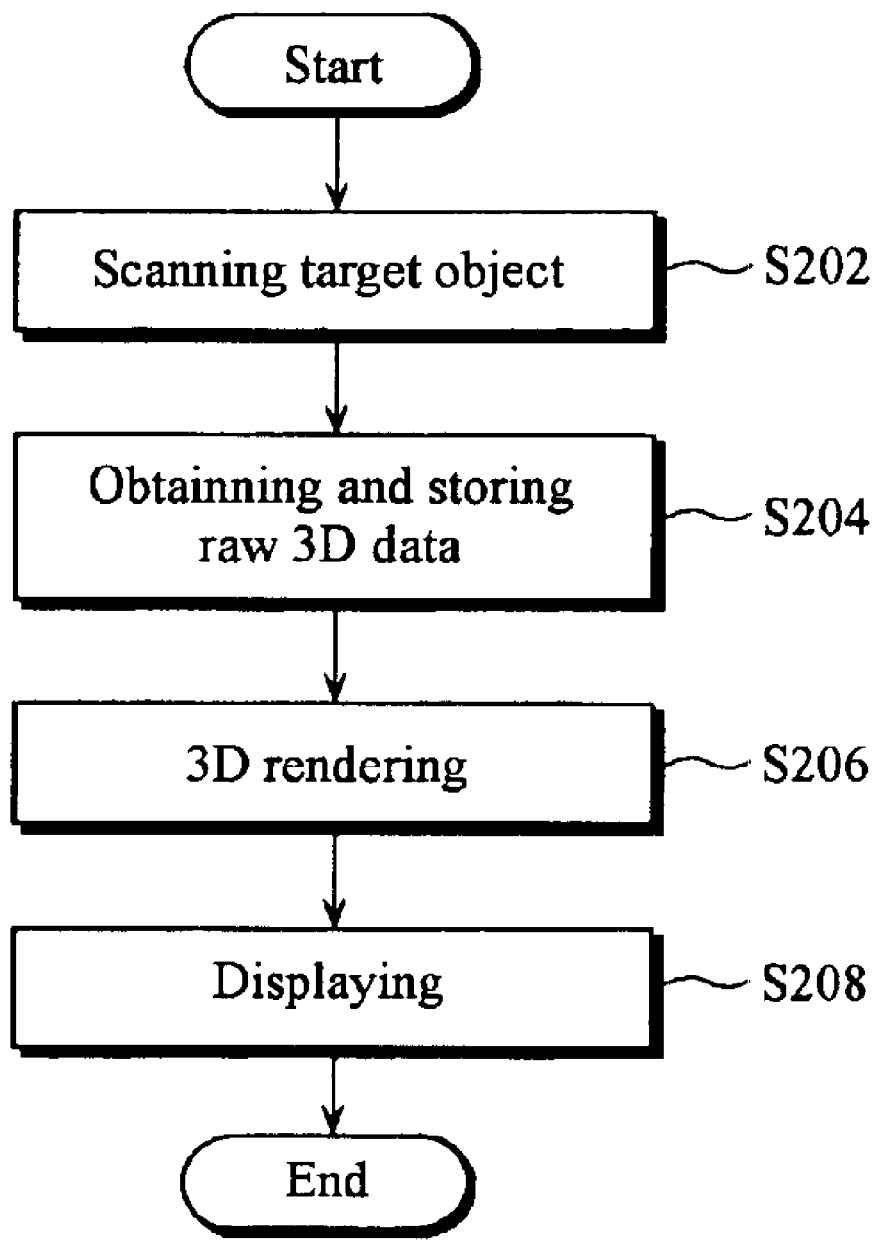
FIG. 2 illustrates a flow chart for conventionally producing a live 3D image of a moving target object.

Referring to FIG. 3, which shows a schematic block diagram of an apparatus for producing a live 3D image in accordance with the present invention, live 3D imaging apparatus 300 comprises probe 302 for transmitting ultrasound signals to a moving target object (not shown) and receiving the ultrasound signals reflected therefrom, image processing unit 310 for producing a live 3D image of the moving target object based on the reflected ultrasound signals transmitted from probe 302, and display unit 308 for displaying the live 3D image produced by image processing unit 310.

Image processing unit 310 includes raw 3D data obtaining unit 304 and enhanced live 3D imaging unit 306. Raw 3D data obtaining unit 304 of image processing unit 310 obtains raw data required for producing the live 3D image based on the reflected ultrasound signals transmitted from probe 302, which are transmitted to enhanced live 3D imaging 306. Raw 3D data obtaining unit 304 sequentially transmits raw 3D data corresponding to each frame of the live 3D image to enhanced live 3D imaging unit 306. Enhanced live 3D imaging unit 306 produces data including the frames of the live 3D image (hereinafter, the original live 3D image frames) to be displayed on display unit 308 based on the raw 3D data transmitted from raw 3D data obtaining unit 304. Enhanced live 3D imaging unit 306 then produces data including virtual image frames to be inserted between the original live 3D image frames based on the original live 3D image frame data. Thereafter, enhanced live 3D imaging unit 306 performs 3D rendering on a live 3D image in which the original live 3D image frames and the virtual image frames are mixed together, using the original live 3D image frame data and the virtual image frame data. Enhanced live 3D imaging unit 306 employs interpolation or extrapolation, to produce the virtual image frame data.

Figure 4A:
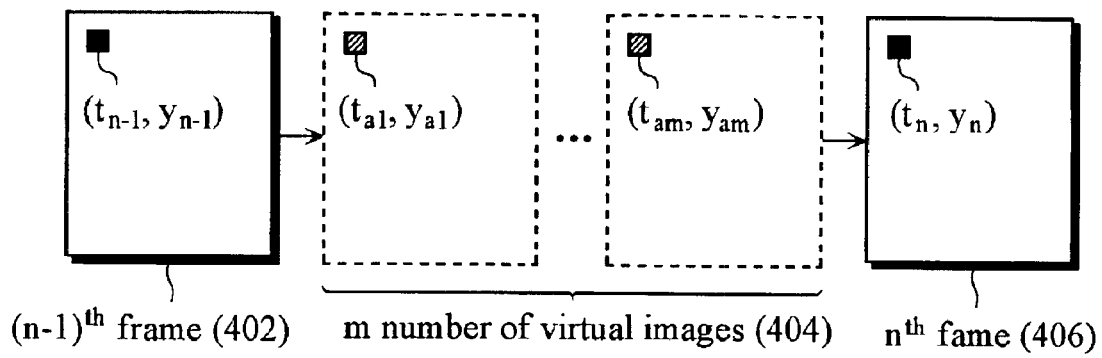
FIG. 4A illustrates virtual image frames produced by using interpolation in accordance with the present invention.
Figure 4B:
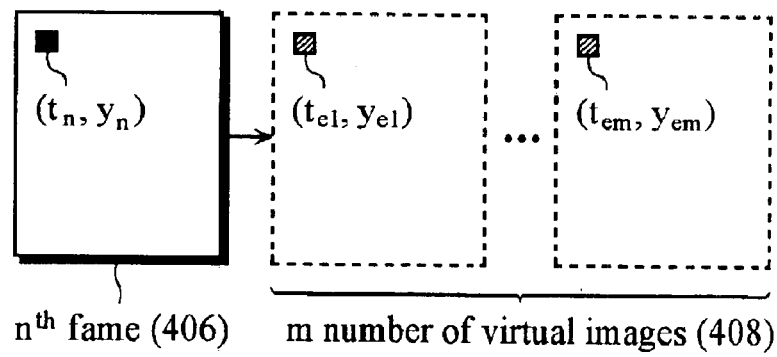
FIG. 4B illustrates virtual image frames produced by using extrapolation in accordance with the present invention.

FIG. 4A illustrates $(n-1)^{th}$ frame 402 and $n^{th}$ frame 406 among n number of the original live 3D image frames, and m number of virtual image frames 404 which are produced by using interpolation and inserted between $(n-1)^{th}$ frame 402 and $n^{th}$ frame 406 among the original live 3D image frames. FIG. 4B illustrates m number of virtual image frames 408 produced by using extrapolation. Virtual image frames 408 are added next to $n^{th}$ frame 406 of the original live 3D image frames. FIG. 4C shows an example of virtual image frames produced by using interpolation as described with reference to FIG. 4A. As may be seen from FIG. 4C, movement of an embryo is represented naturally since the virtual image frames produced are inserted between the $(n-1)^{th}$ frame and $n^{th}$ frame among the original live 3D image frames. Herein, the total number of the original live 3D image frames is n and the total number of virtual image frames produced through interpolation or extrapolation is m, wherein n and m are integers.

As illustrated in FIG. 4A, where enhanced live 3D imaging unit 306 employs linear interpolation, display time $t_{aj}$ of the $j^{th}$ virtual image frame among m number of virtual image frames 404 and a color value $y_{aj}$ corresponding to one of pixels in the $j^{th}$ virtual image frame may be defined as follows:

$$t_{aj} = t_{n-1} + \frac{(m-j)}{m} \times (t_n - t_{n-1}) \quad \text{(Eq. 1)}$$

$$y_{aj} = y_{n-1} \times \frac{(m-j)}{m} + y_n \times \frac{j}{m}$$

wherein $y_{aj}$ is a color value corresponding to a pixel having a coordinate $(t_{aj}, y_{aj})$ among the pixels in the $j^{th}$ virtual image frame; $y_n$ is a color value corresponding to a predetermined pixel in one of the original live 3D image frames, which is displayed at time $t_n$; m is the total number of virtual image frames 404 inserted between $(n-1)^{th}$ frame 402 and $n^{th}$ frame 406; and a is a pixel among the pixels in one of virtual image frames 404. Data including m number of virtual image frames 404 are obtained by applying Equation 1 to every pixel in each of virtual image frames 404. (Hereinafter, virtual image frame data refers to the data including m number of virtual image frames 404) Similarly, when receiving data including the $(n+1)^{th}$ frame (not shown) among the original live 3D image frames, enhance live 3D imaging unit 306 generates virtual image frame data including virtual image frames (not shown) to be inserted between $n^{th}$ frame 406 and $(n+1)^{th}$ frame by repeating the above.

Where enhanced live 3D imaging unit 306 employs high-order interpolation instead of linear interpolation, the $N^{th}$ polynomial expression of interpolation may be expressed as follows:

$$y = c_0 + c_1 t + c_2 t^2 + \ldots + c_n t^n \quad \text{(Eq. 2)}$$

wherein $c_0$ to $c_n$ are arbitrary coefficients; t is the display time of the live 3D image; y is virtual image frame data; and, n is the total number of the original live 3D image frames.

Where m number of virtual image frames to be inserted between $(n-1)^{th}$ frame 402 and $n^{th}$ frame 406 among the original live 3D image frames are generated, display time $t_{aj}$ of the $j^{th}$ virtual image frame among m number of the virtual image frames generated may be expressed by Equation 1 as described above. At display time $t_{aj}$, a color value corresponding to a predetermined pixel in the $j^{th}$ virtual image frame may be expressed as follows:

$$y_{aj} = c_0 + c_1 t_{aj} + c_2 t^2_{aj} + \ldots + c_n t^n_{aj} \quad \text{(Eq. 3).}$$

Data including the $j^{th}$ virtual image frame are obtained by calculating a color value corresponding to every pixel in the $j^{th}$ virtual image frame among m number of the virtual image frames through Equation 3. Where the number of the original live 3D image frames is F, the total number of image frames to be displayed per second, which is obtained by using the linear interpolation and high-order interpolation described above, becomes F*(m+1).

As illustrated in FIG. 4B, where enhanced live 3D imaging unit 306 employs high-order extrapolation, display time $t_{ej}$ of the $j^{th}$ virtual image frame among m number of virtual image frames 408 and a color value $y^{ej}$ corresponding to one of pixels in the $j^{th}$ virtual image frame are defined as follows:

$$t_{ej} > t_n$$

$$y_{ej} = c_0 + c_1 t_{ej} + c_2 t^2_{ej} + \ldots + c_n t^n_{ej} \quad \text{(Eq. 4)}.$$

wherein $y_{ej}$ is a color value corresponding to a pixel having a coordinate $(t_{ej}, y_{ej})$ among the pixels in the $j^{th}$ virtual image frame.

Data including the $j^{th}$ virtual image frame are obtained by calculating a color value corresponding to every pixel in the $j^{th}$ virtual image frame among m number of the virtual image frames through Equation 4. Where the number of the original live 3D image frames is F, the total number of image frames to be displayed per second, which is obtained by using high-order extrapolation described above, becomes F*(m+1).

Although enhanced live 3D imaging unit 306 has been described to produce the virtual image frames to be inserted between the original live 3D image frames by using linear interpolation, high-order interpolation, and high-order extrapolation, enhanced live 3D imaging unit 306 may produce the virtual image frames by using any appropriate technique.

The frame rate of a live 3D image may vary with conditions such as the kind of probe, depth of ultrasound images, and acquisition rate of 3D images. By controlling the number of virtual image frames obtained through interpolation or extrapolation, the operation time for interpolation or extrapolation should be minimized and the virtual image frames should be inserted and displayed at a uniform time interval between the image frames is F frames/second, data including F frames per second are obtained. Accordingly, where m number of virtual image frames are to be inserted between the original live 3D image frames, the time for performing interpolation or extrapolation on m number of the virtual image frames must not exceed 1/(F*(m+1)) seconds, since a live 3D image containing the original live 3D image frames and the inserted virtual image frames should be displayed at every 1/(F*(m+1)) second. Therefore, determining the number of virtual image frames, which may be obtained within 1/(F*(m+1)) seconds, is necessary.

Figure 5:
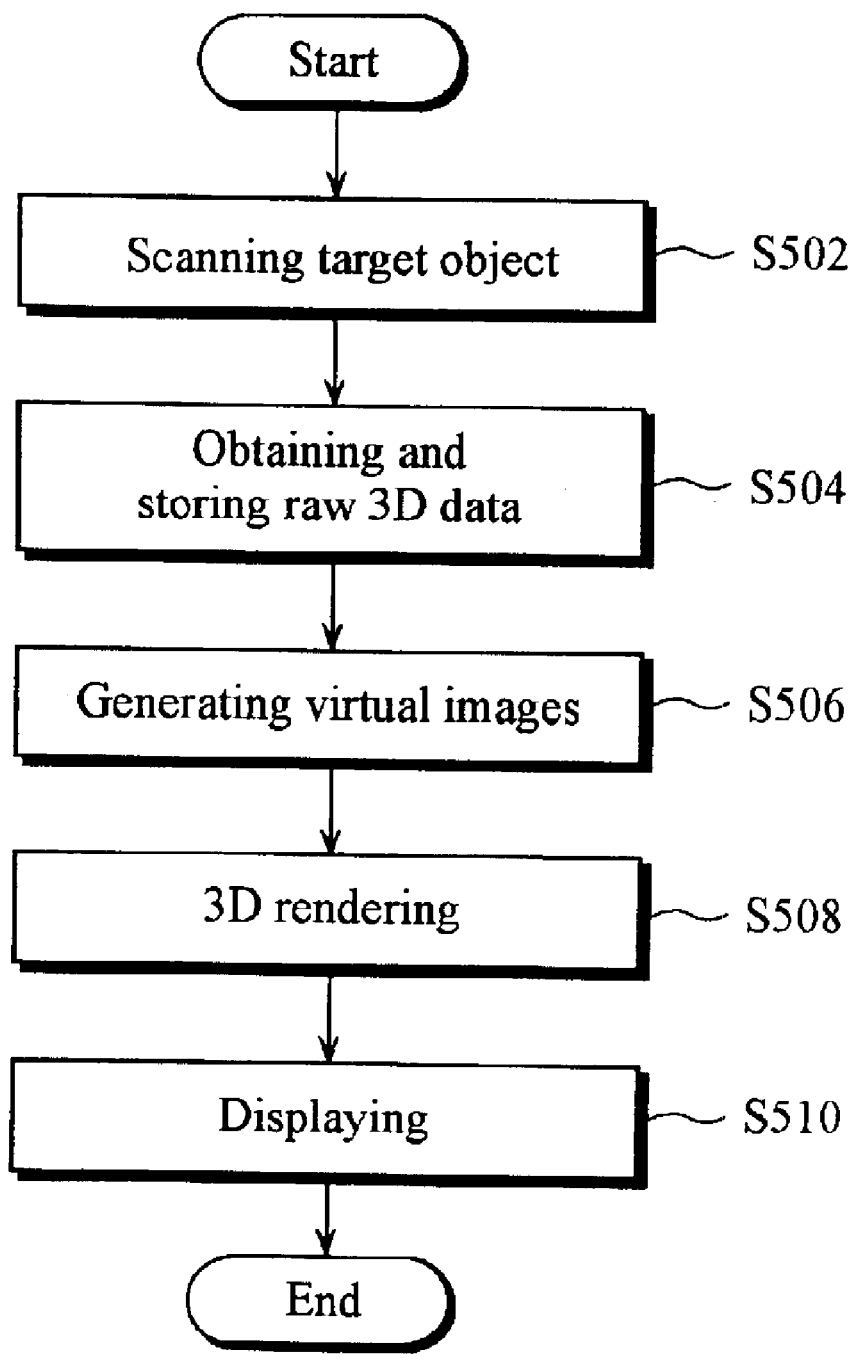
FIG. 5 illustrates a flow chart for producing a live 3D image of a moving target object in accordance with the present invention.

Referring to FIG. 5, which illustrates a flow chart for producing a live 3D image in accordance with the present invention, probe 302 scans a moving target object by transmitting ultrasound signals to the moving target object and receiving the ultrasound signals reflected therefrom (Step S502). Raw 3D data obtaining unit 304 of image processing unit 310 obtains and stores raw 3D data based on the reflected ultrasound signals transmitted from probe 302 (Step S504). Enhanced live 3D imaging unit 306 generates data including original live 3D image frames based on the raw 3D data obtained by raw 3D data obtaining unit 304 and produces data including virtual image frames to be inserted between the original live 3D image frames (Step S506). Enhanced live 3D imaging 306 then renders a live 3D image of the moving target object using the original 3D image data and the virtual image data (Step S508). Display unit 308 displays thereon the live 3D image, i.e., a 3D moving image (Step S510).

As described above, inserting the virtual image frames between the original live 3D image frames raises the frame rate of the live 3D image being displayed. Thus, a more-natural-looking, live 3D image, i.e., a 3D moving image, compared to the conventional live 3D image, is obtained without increasing the calculation load of a live 3D imaging apparatus.

While the present invention has been shown and described with respect to the particular embodiments, those skilled in the art will recognize that many changes and modifications may be made without departing from the spirit and scope of the invention as defined in the appended claims.

What is claimed is:

1. A method for producing a three-dimensional (3D) moving image of a moving target object, comprising:

a) transmitting ultrasound signals to the moving target object and receiving reflected ultrasound signals;

b) obtaining raw data based on the reflected ultrasound signals;

c) generating image frame data including an F number of image frames based on the obtained raw data by using one of interpolation and extrapolation;

d) generating virtual image frame data including an mF number of virtual image frames, which are to be inserted between the F number of image frames, based on the image frame data; and e) rendering a 3D moving image of the moving target object using the image frame and virtual image frame data at a rate of F(m+1) frames/second.

2. An apparatus for producing a three-dimensional (3D) moving image of a moving target object, comprising:

a probe for transmitting ultrasound signals to the moving target object and receiving reflected ultrasound signals;

means for obtaining raw data based on the reflected ultrasound signals; and means for generating image frame data including an F number of image frames based on the obtained raw data by using one of interpolation and extrapolation, generating virtual image frame data including an mF number of virtual image frames, which are to be inserted between the F number of image frames, based on the image frame data, and rendering a 3D moving image of the moving target object using the image frame and virtual image frame data at a rate of F(m+1) frames/second.

* * * * *